July 23, 1946.  J. C. THOMAS, 3D  2,404,548
MIXING CHAMBER
Filed March 14, 1945
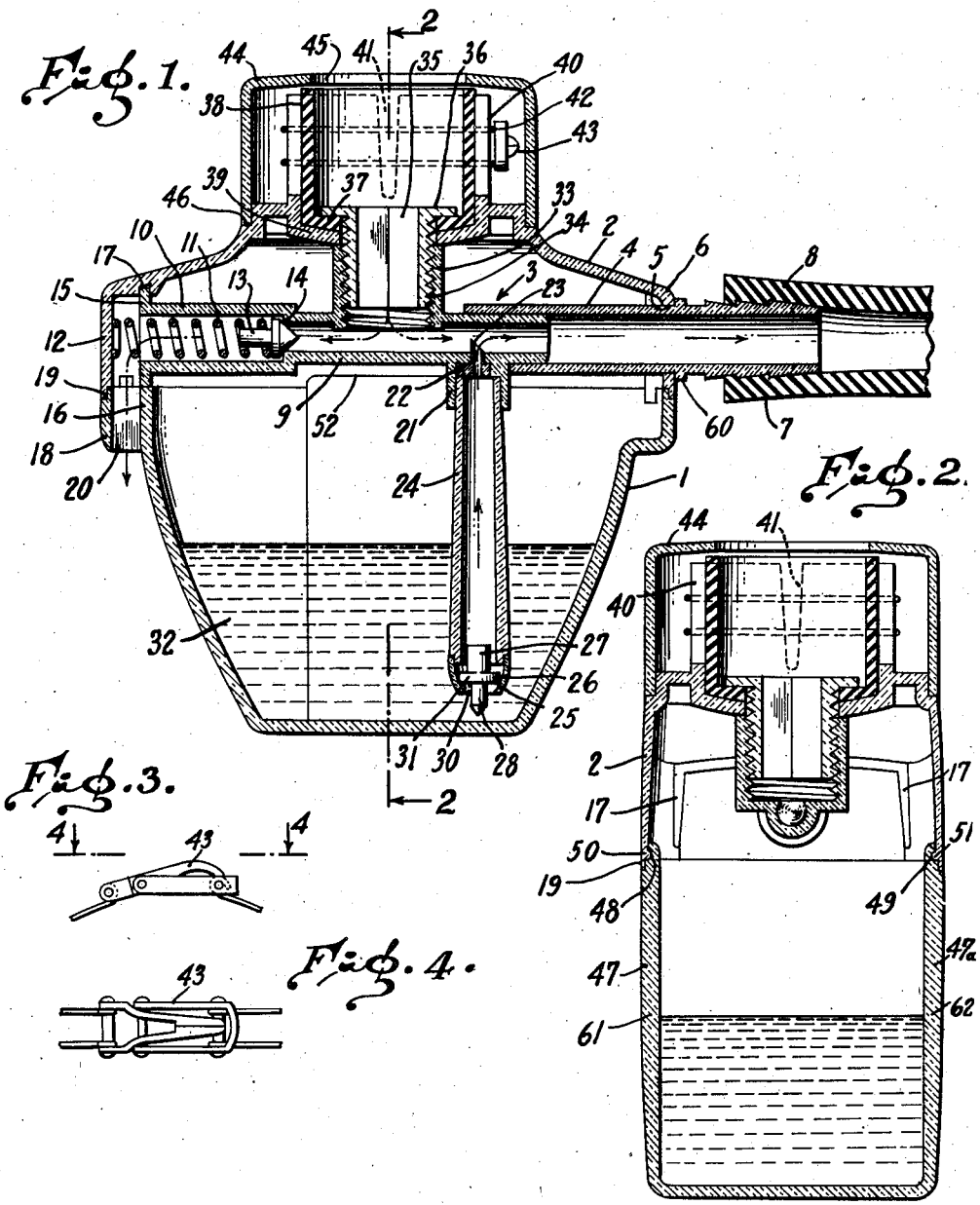
JAMES C. THOMAS III,
INVENTOR.
BY [signature]
ATTORNEY Patented July 23, 1946

2,404,548

UNITED STATES PATENT OFFICE 2,404,548

MIXING CHAMBER

James C. Thomas, III, El Segundo, Calif.

Application March 14, 1945, Serial No. 582,672

8 Claims. (Cl. 299—84)

The invention relates to a mixing chamber or fluid mixing device for mixing any desired fluid medicine or the like with a stream of water from a faucet.

An object of the invention is to by-pass the water from the faucet without diluting the liquid in the container, whereby the operator may shut off the mixed fluid outlet and regulate the volume and temperature of the water to be used, without thereby wasting or diluting the medicine or the like in the mixing chamber, while automatically mixing the fluid in the chamber with the water from the faucet on opening the mixed fluid outlet.

Another object of the invention is to provide a device of the character described of moldable material such as plastic.

Another object of the invention is to provide a mixing chamber adapted to be mounted on and supported by the faucet spout.

For further details of the invention reference may be made to the drawing, wherein:

Figure 1 is a vertical sectional view of a mixing chamber or device according to the present invention.

Fig. 2 is a sectional view on line 2—2 of Fig. 1, looking in the direction of the arrows.

Figs. 3 and 4 are views in side elevation and plan, respectively, of the toggle of Fig. 1 for clamping the device of Fig. 1 to a faucet spout, not shown.

Referring in detail to the drawing, the mixing chamber or device of this invention comprises a container 1 having a cap 2 in which is mounted a transverse conduit fitting 3. The conduit fitting 3 comprises two telescoping sections of which the section 4 passes through an aperture 5 in the side wall 6 of the cap 2, the section 4 terminating at its outlet end in a stop flange 60 and in corrugations 7 forming a connection for a hose 8. The hose 8 has a conventional clamp or shut-off valve, not shown. Fitting in the pipe section 4 is an aligned section 9 having at its outer end an enlarged bore 10 in which is arranged a compression spring 11 which bears at its outer end on the side wall 12 of the cap 2 and at its inner end on a relief valve 13 having a valve seat 14.

The outer end of the transverse conduit section 9 terminates in a flange 15 which serves as a wall portion which supplements and fits on the complementary wall portion 16 of the container 1. The flange or wall portion 15 at its opposite sides and top fits in a groove 17 in the cap 2. The side wall 16 of the container 1 has an outwardly extending flange 18 and the flange 18 and the top of container 1 removably interfit as indicated by the interfitting portions 19. The bore 10 at its left end opens into the space between the wall 12 and the flange 15 and the latter space in turn, opens into the space between the wall 16 and the flange 18 to provide a relief outlet indicated at 20.

Depending from the conduit section 9 is an annular flange 21 in which is fitted a suction tube nozzle 22 having an outlet 23 which projects into the conduit section 9 and faces outwardly of the conduit section 4, which serves as a mixed fluid outlet. Sealed into the flange 21 below the suction tube nozzle 22 is the top of a suction tube 24, the lower end of which carries a cap 25 which houses a check valve 26 having an upper stem 27 guided in the lower end of tube 24 and having a stem 28 which extends through an enlarged inlet aperture 30 in the lower end of cap 25. The valve 26 has a circular valve head 31 which seats on the inside of cap 25 when there is pressure in the suction tube 24. Valve 26 opens to admit fluid indicated at 32 from the container 1 into the tube 24 when water from the faucet, not shown, is flowing through the transverse conduit section 9 to the mixed fluid outlet 4.

Arising from the conduit section 9, between the suction outlet 23 and the relief valve 13 is a sleeve 33 which serves as an inlet and is provided with internal screw threads 34.

Threaded into the threads 34 is a hollow thimble 35 having at its upper end a flange 36 which overlies an inwardly-projecting flange 37 on a rubber sleeve washer 38. The washer flange 37 fits on an inturned flange 39 at the base of the neck 40 of the cap 2. The washer flange 37 is clamped on the neck flange 39, between the thimble flange 36 and the said flange 39, to prevent leakage at that place, and to prevent the sleeve washer 38 from blowing out when the device is in use.

The means herein disclosed for clamping the mixing device 1—2, to the spout of a faucet, not shown, is described and claimed in my copending application, Serial No. 582,673, filed March 14, 1945, for Faucet attachment, and here is shown as comprising a compressible neck 40 which arises from and is integral with the cap 2 and provided with a number of longitudinal slots 41, here indicated as four in number, whereby the neck 40 being of plastic material is compressible. Around the neck 40 is arranged a clamping band 42 having a toggle 43 so that the neck 40 can be clamped or unclamped from the faucet spout.

If desired, use may be made of an auxiliary cap 44 having a top opening 45 to receive the faucet, the cap 44 fitting on a shoulder 46 on the top 2.

All of the parts shown, except the spring 11, hose 8, sleeve washer 38 and clamping band 42 and toggle 43, may be cast of moldable material such as plastic which is slightly flexible when in the form of a hollow container and cap as indicated at 1, 2. Accordingly, the opposite side walls 47, 47a as indicated in Fig. 2, may be pressed inwardly at their top to release the grooves 48, 49 from the ribs 50 and 51 at the lower edges of the cap 2, to remove container 1 from cap 2 while the latter is clamped on the faucet. The ribs and grooves 48 to 51 need not extend the full width of the container 1 and are illustrated in Fig. 1 as extending approximately ⅓ of the width of the container, as indicated at 52. The side walls of container 1 may be thickened for the length of the grooves 48, 49 as shown at 61, 62. The container 1 and cap 2 at their meeting edges 19 are somewhat rectangular in cross section, whereby the opposite side walls 47 and 48 and the companion side walls on the cap 2 are substantially flat.

In assembling the device the check valve 26 is mounted in the lower end of tube 24 and the cap 25 is cemented or fused in the position shown, with a plastic solvent. The tube 24 with the suction nozzle 22 above it, are cemented in the sleeve 21. The conduit section 9, after placing the relief valve 13 and spring 11 in place, is mounted in the cap, with flange 15 fitted in the recess 17. Then the conduit section 4 is passed through the opening 5 from right to left, and telescoped in and cemented to the conduit section 9. The sleeve 38 is fitted in the neck 40 and clamped in position by the thimble 35. Thus, there is mounted in the cap 2 a T shaped integral fitting wherein one branch is the relief passage 10, the other branch the mixed fluid outlet 4, the stem being the suction tube 24, with an inlet sleeve 33 arising from section 9 between relief valve 13 and suction tube 24. The device is then ready for use as above described, and when the toggle 43 is employed to clamp the neck 40 and the washer 38 to the faucet spout, the latter will support the mixing device 1, 2.

A particular advantage of the construction above described is that after the operator places a desired amount of medicine or other fluid 32 in the container 1, and fits it onto the cap 2 which is assumed to be clamped on the faucet spout, the operator may then close off the hose 8, turn on the faucet and adjust the relative amounts of hot and cold water, and its volume, while such water is by-passed through the relief valve 13 and relief outlet 20 without entering container 1 or picking up any of the fluid 32. When the operator desires to discharge through the hose 8 a mixture of the water from the faucet and the fluid 32, it is simply necessary to open the valve, not shown, in the hose 8, whereupon the spring 11 closes the relief valve 13 and the water in rushing past the suction outlet 23 picks up some of the fluid 32 which is mixed with it and discharged through the hose 8.

It will be apparent that various modifications may be made in the invention without departing from the spirit of the following claims.

I claim:

1. A fluid mixing device comprising a mixing chamber having therein a transverse conduit of which one end is a relief outlet and the other end a mixed fluid outlet, a spring pressed relief valve closing said relief outlet, a suction tube depending from said conduit between said outlets, a check valve opening to suction and closing to prevent reverse flow for said suction tube, said suction tube having in said conduit an outlet facing said mixed fluid outlet, and a fluid inlet opening into said conduit between said suction tube outlet and said relief valve, said parts being constructed and arranged so that fluid from said inlet can discharge through said relief outlet and not through said suction tube into said chamber when said mixed fluid outlet is closed, said relief valve being closed and mixed fluid delivered to said mixed fluid outlet when the latter is open.

2. A fluid mixing device having a container and a cap therefor, said cap having a conduit fitting therethrough, one end of said conduit fitting being a mixed fluid outlet and the other end of said passage being a relief outlet to the outside of said container, a relief valve for said relief outlet, a suction tube having an inlet in its lower end and an outlet in said conduit fitting, and a faucet connection having an inlet conduit opening into said conduit fitting on the side of said suction outlet opposite said mixed fluid outlet and between said suction outlet and said relief outlet.

3. A fluid mixing device according to claim 2 wherein said container has a wall, one portion of said cap projecting beyond the companion wall portion of said container, and the relief outlet end of said passage having a flange inwardly spaced from the inside of said cap portion and fitting on and complementing said wall portion.

4. A fluid mixing device comprising a container having a cap, said cap having side walls and a neck, a substantially T-shaped conduit fitting having an inlet arising from one branch of said T the outer end of which terminates in a relief passage leading to the outside of said container, a relief valve therefor, the outer end of another branch being a mixed fluid outlet, and the stem of said T being a suction tube for said container, means for supporting the outlet branches of said T on the opposite walls of said cap and means for supporting said inlet in said neck.

5. A fluid mixing device comprising a container having a cap, said cap having a neck having an inturned flange at its inner end, a sleeve washer in said neck and having a flange overlying said neck flange, a conduit fitting having inlet, outlet and suction branches, and a thimble secured to said inlet branch and clamping said washer flange and said inlet branch to the opposite sides of said neck flange.

6. A fluid mixing device comprising a container having a cap, said cap having a neck having at its inner end an inturned flange, a mixing conduit fitting housed in said cap, said conduit fitting having a threaded sleeve comprising an inlet, a sleeve washer and a thimble having a flange overlying said neck flange, said thimble having external thread engaging said threaded sleeve on the other side of said neck flange with said neck flange clamped between and supporting said thimble and said sleeve.

7. A fluid mixing device comprising a container having a cap, said cap having a neck and side walls, a transverse conduit inside of said cap and having a support in each of the opposite walls of the cap, one end of said conduit comprising a relief outlet, a relief valve in said relief outlet, the other end of said conduit comprising a mixed fluid outlet, an inlet sleeve arising from said conduit and having a supporting connection with said neck, and a suction tube for said container depending from said conduit on the mixed fluid outlet side of said inlet.

8. A mixing device comprising an integral conduit fitting having an inlet and two outlets therefor, means for supporting said fitting on a faucet spout, said means comprising means for securing said inlet to the spout, a hose connection on one of said outlets, a spring pressed relief valve closing said other outlet when said hose outlet is open, said relief valve opening when said hose outlet is closed or restricted, a suction tube on said fitting for said hose outlet, and a container for said suction tube and united with said fitting.

JAMES C. THOMAS, III.